Aug. 31, 1937.  F. W. GODSEY, JR  2,091,920
ELECTROLYTIC CONDENSER
Filed Sept. 3, 1935
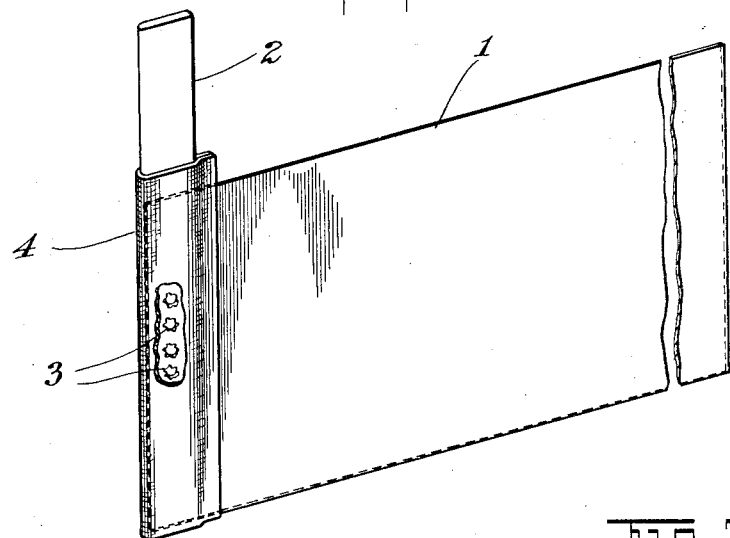
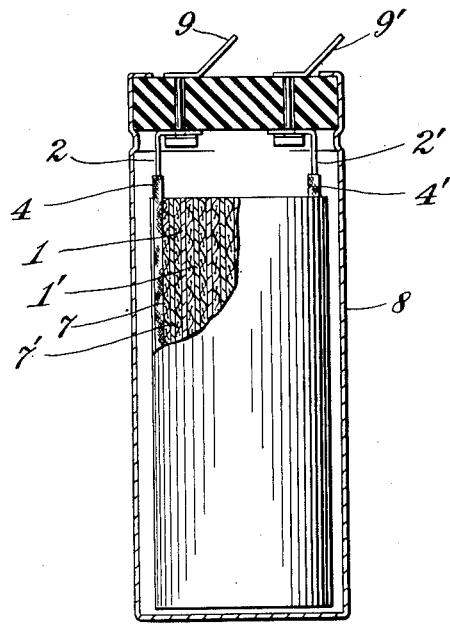
INVENTOR.
FRANK W. GODSEY JR.
BY
ATTORNEYS Patented Aug. 31, 1937

2,091,920

UNITED STATES PATENT OFFICE 2,091,920

ELECTROLYTIC CONDENSER

Frank W. Godsey, Jr., North Adams, Mass., assignor to Sprague Specialties Company, North Adams, Mass., a corporation of Massachusetts Application September 3, 1935, Serial No. 39,021

4 Claims. (Cl. 175—315)

My present invention relates to electrolytic condensers, and more particularly to electrolytic condensers of the rolled type, and relates to novel means therefor to secure and protect the conductors leading from the electrode foils to outside terminals.

I shall describe my invention in connection with so-called "dry" electrolytic condensers having electrolytes of reduced fluidity, which may be a viscous liquid, a paste, or a semi-dry electrolyte, and which comprises as ionogen a weak acid, as boric acid, phosphoric acid and the like, and/or a salt of a weak acid, and an ionizing solvent which comprises as a rule a polyhydric alcohol, as ethylene glycol, glycerol, etc., and usually also some water; however my invention is not limited to condensers of this type.

In condensers of the rolled type it has been usually the practice to provide electrical connections of the electrode foils to an outside terminal by means of one of the following two constructions: In one construction an extension of the electrode foil forms an integral extension tab. This construction has the disadvantage of mechanical weakness as the tab material is the usually quite thin foil, and even if the tab is formed by folding over the foil several times, the junction between the electrode foil and the tab is weak and apt to tear. In addition this construction requires a considerable amount of extra foil material.

In the other construction the tab is made of a separate metal strip, the material and thickness of which can be selected at will so that the mechanical strength of the tab proper be satisfactory. The connection of the tab with the electrode foil is usually made by riveting or otherwise securing the foil to the tab; this junction, however, is usually also mechanically weak.

Besides the mechanical weakness of the junction between the tab and foil, which occurs in both constructions, these constructions have a further and even more serious drawback, which especially manifests itself in the case of the anode, namely, due to the electrochemical and chemical reactions which take place in the condenser, the tab as well as its junction with the electrode foil is attacked, especially where the tab passes from the electrolyte into the air, and at its freshly-cut edges. This attack causes corrosion of the tab and its gradual disintegration and mechanical weakening, whereby quite often the tab is entirely severed from the foil or from the external terminal with which it has been connected, thus causing the open-circuiting of the condenser.

A coating of shellac or enamel somewhat reduces the danger of corrosion of the tab, but does not increase the mechanical strength of the junction between the tab and the foil, and has the drawback that it easily peels off, especially if the assembled condenser is subjected to heat-treatment, as in aging or baking, or to heat in the use of the condenser.

My present invention solves in a very simple manner all of the above difficulties, as it not only strengthens the junction between the foil and the tab, but provides for an air- and liquid-tight envelope for the tab, as well as for the tab-foil, which it protects from all chemical and electrochemical attack by the electrolyte.

My invention will be described on hand of a specific example and in connection with the drawing forming part of the specification, and in which:

Figure 1 is a schematic perspective view of an electrode foil with the tab secured and protected in accordance with my invention;

Fig. 2 is a partly sectionized side view of a condenser in accordance with the invention.

Referring to Figure 1, the electrode foil 1 consists of aluminum or similar film-forming material, having as a rule a thickness of about .001" to .004", and is provided with an electrolytically-formed film, the film formation being achieved in well-known manner.

The electrode tab 2 is shown to be a separate metal strip having a greater thickness than the foil, and may be of any suitable metal, whether film-forming or non-filming. The tab 2 is suitably secured to the foil 1, for example by forming a plurality of small prongs 3 from the tab, which rivetedly engage the foil.

Around the tab 2, I provide a strip of a material which is impermeable to the electrolyte and at the same time has strong adhesive properties, for example a strip of linen, paper, or fabric which is impregnated or coated with a suitable wax or tar, giving the strip the above required properties. The strip 4 overlaps the tab 2 on both sides and extends beyond the tab to also partly cover the foil. The strip 4 extends upwardly beyond that portion of the tab which, in the assembled condenser, falls at the electrolyte-air interface.

It will be noted that the strip 4 mechanically strengthens and at the same time liquid- and air-tightly protects the tab-electrode foil junction, as well as protects the tab from attack by the electrolyte.

Instead of forming the tab as a separate strip it can be formed integral with the foil in known manner, the advantages of my invention being obtained also in this case.

The condenser shown in Fig. 2 comprises two foils 1—1', which in case of so-called "A. C." condensers, are usually both filmed, whereas for so-called "D. C." condensers only one of the electrode foils, namely the anode, needs to be filmed, although even in the latter case I prefer to make both electrodes of film-forming material, for example of aluminum.

The tabs 2—2' with their protecting strips 4—4' are provided on the foils 1—1' in the manner described in connection with Fig. 1 and the electrode foils 1—1', together with spacers 7—7', which may be of paper, gauze or the like, are rolled together into an assembly. The electrolyte is carried by the spacer, whereby the spacers may be coated or impregnated with the electrolyte either before or after the assembly of the condenser.

The assembled condenser may be placed in a suitable container 8, the tabs 4—4' being connected at their free ends to terminals 9—9', provided on the container.

The condenser, as a rule, is subjected to a baking process as described in the patent to Preston Robinson #1,935,860 during which the strips 4—4, instead of peeling off as would be the case with shellac or other protective coatings, more closely adhere to and thus further improve the protection of the tabs and foil.

The advantages of my construction not only consist in mechanically reinforcing the connection between the tab and the foil and protecting this connection as well as the tab from contact with the electrolyte, but it also prevents mechanical defects in the construction of the tab from being transmitted to other portions of the condenser, and prevents excessive leakage from occurring on unformed portions of the tab. This construction, as it fully protects the tab from the electrolyte, furthermore permits the use of any kind of metal for the tabs, which for mechanical reasons, may be preferable to aluminum or other filming metal.

While I have described my invention in connection with specific examples and in specific applications, I do not wish to be limited thereto, but desire the appended claims to be construed as broadly as permissible in view of the prior art.

I claim:

1. In an electrolytic condenser, an electrode foil and an electrode tab extending therefrom, and means to mechanically and chemically protect said tab, said means comprising a strip which overlaps said tab on both sides and extends along said tab beyond the point where the electrolyte of the condenser could contact with the tab, said strip being formed of a fabric impregnated with an adhesive and sealing compound, said strip liquid-tightly sealing said tab.

2. In an electrolytic condenser, an electrode foil and an electrode tab extending therefrom, and means to mechanically and chemically protect said tab, said means comprising a strip which overlaps said tab on both sides and extends along said tab beyond the point where the electrolyte of the condenser could contact with the tab, said strip being formed of a fabric impregnated with a tar-like substance, said strip liquid-tightly sealing said tab.

3. An electrolytic condenser comprising two electrode foils at least one of which is provided with a film, and a viscous electrolyte interposed between said foils, electrode tabs extending from said foils, said foils and electrolyte forming a compactly-wound roll, and means to mechanically and chemically protect said tabs, said means comprising a strip which overlaps on both sides said tab and extends along said tab beyond the point where the electrolyte can reach same, said strip adhering to said tab and liquid-tightly sealing same.

4. In the method of manufacturing dry electrolytic condensers, the process which comprises, providing electrode foils with tab extensions, surrounding said tabs with strips of fabric impregnated with a compound having high adhering and sealing properties, assembling into an assembly said electrode foils with a viscous electrolyte, and subjecting said assembly to a heat treatment to increase the adhering and sealing properties of said strip.

FRANK W. GODSEY, JR.